United States Patent
Smith et al.

(10) Patent No.: US 6,810,235 B2
(45) Date of Patent: Oct. 26, 2004

(54) METHOD AND APPARATUS FOR DETECTING COMMUNICATION NETWORK DELAYS

(75) Inventors: Ralph Smith, San Diego, CA (US); Doug DePoister, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 70 days.

(21) Appl. No.: 10/382,194

(22) Filed: Mar. 4, 2003

(65) Prior Publication Data

US 2004/0176041 A1 Sep. 9, 2004

(51) Int. Cl.[7] .............................................. H04B 17/00
(52) U.S. Cl. .................. 455/67.1; 455/67.11; 455/67.7
(58) Field of Search ................................ 455/423, 424, 455/425, 521, 67.11, 67.16, 67.7, 412.1–612.2; 370/252, 253

(56) References Cited

U.S. PATENT DOCUMENTS

| | | | |
|---|---|---|---|
| 5,423,058 A | * 6/1995 | Cudak et al. | ............... 455/503 |
| 5,455,965 A | * 10/1995 | Shaughnessy et al. | ...... 455/503 |
| 5,612,949 A | * 3/1997 | Bennett | ....................... 370/253 |
| 6,493,539 B1 | * 12/2002 | Falco et al. | .............. 455/67.11 |
| 6,687,501 B2 | * 2/2004 | Soliman | ..................... 455/424 |
| 2002/0009974 A1 | * 1/2002 | Kuwahara et al. | ......... 455/67.6 |

FOREIGN PATENT DOCUMENTS

EP  1209850  * 5/2002  .......... H04L/12/24

* cited by examiner

*Primary Examiner*—Vivian Chin
*Assistant Examiner*—Tuan Tran
(74) *Attorney, Agent, or Firm*—Philip R. Wadsworth; Charles D. Brown; Thomas M. Thibault

(57) ABSTRACT

A method and apparatus for detecting communication network delays. In general, messages from vehicles are time stamped, and then the time stamp is compared to a time that each message is received by a central station. A processor at the central station then determines a time difference between the time stamp and the received time. The time difference is then compared to a predetermined time. If more than a predetermined number of messages is received by the central station exceeding the predetermined time, a notification is sent to an entity, such as personnel at the central station.

3 Claims, 3 Drawing Sheets

METHOD AND APPARATUS FOR DETECTING COMMUNICATION NETWORK DELAYS

BACKGROUND

I. Field

The ideas presented herein relate to the field of data communications. More specifically, to a method and apparatus for determining network latency for delivery of packet-based information.

II. Description of the Related Art

The use of wireless communication systems are well known for transmitting information between, for example, fixed stations and one or more geographically dispersed mobile receivers. For example, satellite and/or terrestrial wireless communication systems have been used in the trucking industry for many years to provide messaging and location information between fleet-owned dispatch centers and their respective tractor-trailer vehicles. Such systems offer significant benefits to fleet owners because they allow almost instantaneous communications and real-time position information. In addition, many such systems provide remote monitoring of the performance characteristics of each fleet-owned vehicle, such as the average vehicle speed, RPM, idle time, and other characteristics.

In such wireless communication systems, fleet-owned dispatch centers typically communicate with their respective vehicles through a central station, otherwise known as a hub, network management center (NMC), or network management facility (NMF). Communications between dispatch centers and the central station are often sent over land-based communication systems such as telephone or fiber-optic networks. The central station then forwards information to one or more vehicles via a satellite or terrestrial communication system.

Each vehicle in the communication system is equipped with a transceiver, otherwise known as a mobile communication terminal (MCT), for communicating message and location information to their respective dispatch centers via the satellite or terrestrial communication system and central station. The MCT typically also comprises an interface device which displays text messages to one or more vehicle occupants and accepts either voice or text messages to be transmitted to the vehicle's fleet-owned dispatch center. Furthermore, the MCT may further comprise circuitry which allows it to communicate with one or more Electronic Control Units (ECUs) located at various points throughout the vehicle. Each ECU provides information relating to the operational performance of the vehicle to the digital computer indicating characteristics including, but not limited to, vehicle speed, engine RPM, and miles traveled.

The wireless communication system described above allows vehicle occupants to easily contact their respective dispatch centers in order to keep fleet personnel apprised of various events throughout a typical delivery cycle. For example, upon arrival at a predetermined pickup destination, a truck driver may contact a dispatch center associated with the vehicle to alert fleet personnel of the time and location of the arrival. Similarly, after the truck has been loaded at the pickup destination, the driver may send a message to the dispatch center indicating the time of departure, the location from where the departure occurred, and a description of the goods that is being transported. Another example where a vehicle operator might transmit a status message to the dispatch center is when an unscheduled stop has been made and/or when the vehicle departs from the unscheduled stop.

In many instances, fleet owners need to communicate with hundreds, and sometimes thousands, of vehicles each day. It is also often important that messages be delivered in a timely fashion. Occasionally, delays may be caused by disruptions of the satellite or terrestrial communication system. When this occurs, messages may be delayed by seconds, or as much as hours or days. Obviously, if significant delays occur, it could have a dramatic effect on fleet efficiency as well as increase costs for fleet owners. Therefore, there is a need for network operators to be able to detect delays in the communication network(s), so that problems with those networks can be identified and fixed.

SUMMARY

A method and apparatus for detecting communication network delays. In one embodiment, an apparatus comprises a receiver for receiving a message from a vehicle, said message comprising a time stamp indicating when the message was transmitted. A processor is used for determining a time that the message was received, for determining a time difference between the time stamp and the time when the message was received, for comparing the time difference to a predetermined time, for determining a number of messages received having a time difference greater than said predetermined time, and for generating a notification if said number of messages received having a time difference greater than said predetermined time exceeds a predetermined number. Finally, an interface is used for providing the notification to an entity.

In another embodiment, an apparatus for detecting communication network delays comprises a signal-bearing medium tangibly embodying a program of machine-readable instructions executable by a digital processing apparatus to perform a method for validating a vehicle operator, the method comprising operations of receiving a message from a vehicle, the message comprising a time stamp indicating when the message was transmitted, determining a time that the message was received, determining a time difference between the time stamp and the time when the message was received, comparing the time difference to a predetermined time, determining a number of messages received having a time difference greater than said predetermined time, and generating a notification if said number of messages received having a time difference greater than said predetermined time exceeds a predetermined number.

In yet another embodiment, a method for detecting communication network delays comprises receiving a message from a vehicle, said message comprising a time stamp indicating when the message was transmitted, determining a time that the message was received, determining a time difference between the time stamp and the time when the message was received, comparing the time difference to a predetermined time, determining a number of messages received having a time difference greater than said predetermined time, and generating a notification if said number of messages received having a time difference greater than said predetermined time exceeds a predetermined number.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
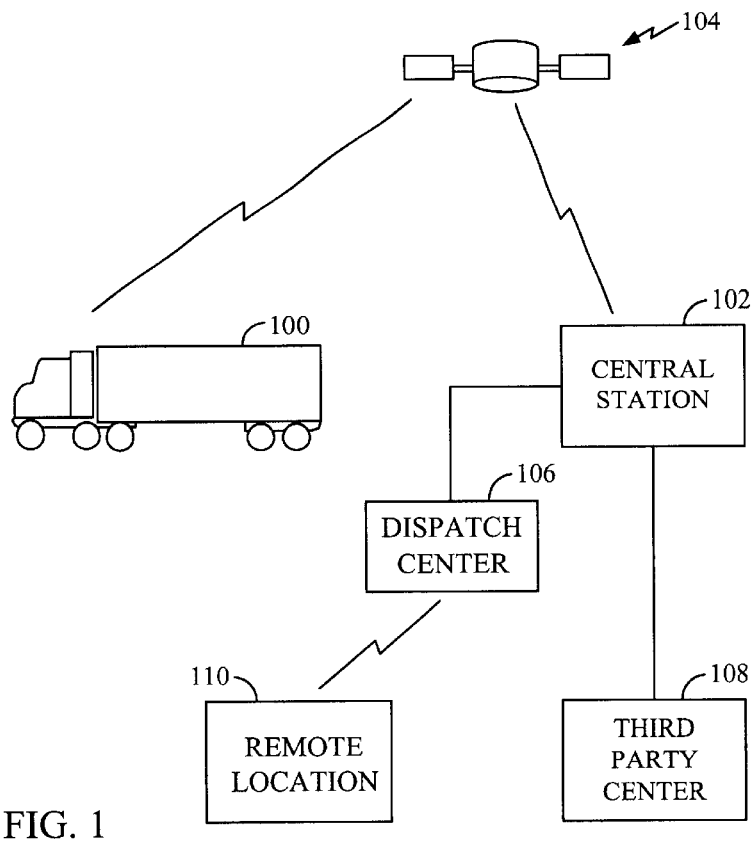
FIG. 1 illustrates a wireless communication system in which the method and apparatus for detecting communication network delays is used.

FIG. 1 illustrates a wireless communication system widely used in the trucking industry for allowing two-way communications between vehicle operators and third parties, such as a fleet management center or dispatch center, family members, governmental authorities, consignees, shippers, and so on. Although the method and apparatus for detecting communication network delays is described herein with respect to a tractor-trailer vehicle communicating through a terrestrial-based wireless communication system, it should be understood that any other wireless communication system could be used in the alternative, including a satellite communication system, a microwave communication system, a PSTN telephone system, and so on. It should also be understood that the method and apparatus for detecting communication network delays could also be used in conjunction with other types of vehicles, such as buses, aircraft, automobiles, and watercraft, among others.

Referring now to FIG. 1, vehicle 100 in this example comprises a tractor-trailer, commonly used in the long-haul trucking industry to transport goods from shippers to consignees. Vehicle 100 comprises a mobile communication terminal (MCT, not shown) for communicating with a central station 102 via a terrestrial communication system 104. Generally, the MCT resides onboard a tractor portion of vehicle 100, in one embodiment. In one embodiment, central station 102 comprises a central processing center, otherwise known as a hub, or network management center (NMC), and serves as a central communication point between MCT-equipped vehicles and their respective dispatch centers, other designated office(s), shippers, consignees, governmental authorities, family members, and so on. For example, in FIG. 1, central station 102 passes communications between dispatch center 106 and vehicle 100. Dispatch center 106 generally monitors and controls a fleet of vehicles 100.

Communications between dispatch center 106 and vehicle 100 may further be passed to one or more other entities, such as third party center 108. Third party center 108 comprises one of any number of interested third parties to communications between central station 102 and vehicle 100. For example, third party center 108 could comprise another designated office of central station 102, a shipper of goods being carried by vehicle 100, a consignee of goods being carried by vehicle 100, a wireless network operations center, a governmental unit, a personal computer, a mobile response unit such as an ambulance, fire crew, or other emergency vehicle, and so on. It should also be understood that dispatch center 106 and third party center 108 may also communicate with other entities, for example, communicating wirelessly with remote location 110 as shown in FIG. 1. Remote location 110 could comprise any dispatch or other third party mentioned above. Communications among central stations 102, 106, 108, and 110 may be carried out by any known communication techniques, including telephone, internet, dedicated lines, wireless links, and so on.

The MCT located on vehicle 100 transmits and receives communications wirelessly using, in one embodiment, a terrestrial wireless communication system to communicate with central station 102, such as an analog or a digital cellular telephone system, an RF communication system, or a wireless data communication network, such as a cellular digital packet data (CDPD) network. In another embodiment, the MCT uses a satellite communication system.

Figure 2:
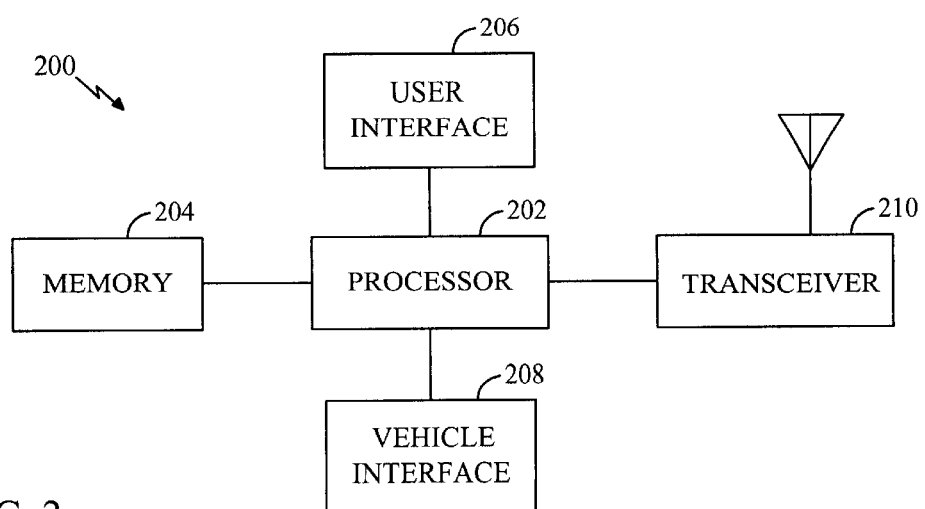
FIG. 2 is a functional block diagram of one embodiment of a mobile communication terminal used in the communication system of FIG. 1.

FIG. 2 is a functional block diagram of one embodiment of the MCT, discussed above, herein MCT 200. MCT 200 generally comprises a processor 202, a memory 204, a vehicle operator interface 206, a vehicle interface 208, and a transceiver 210. It should be understood that the functional blocks shown in FIG. 2 may be housed together in a single MCT unit, or they may be distributed in any combination throughout vehicle 100. For example, the transceiver 210 may or may not be incorporated into the physical structure of MCT 200.

Processor 202 generally comprises circuitry necessary for executing machine-readable instructions stored in memory 204. For example, processor 202 may comprise a microprocessor and supporting circuitry, such as the Intel 80x86 or Pentium series of microprocessors. Of course, other electronic processors could be used in the alternative. Memory 204 may comprise one or more signal-bearing mediums tangibly embodying one or more programs of machine-readable instructions executable by a digital processing apparatus, such as processor 202. Typically, memory 204 comprises one or more volatile and/or non-volatile memories, such as a read-only memory (ROM), random-access memory (RAM), electrically erasable programmable read-only memory (EEPROM), a hard drive, a floppy disk drive and floppy disk, or a flash memory. Memory 204 is used to store instructions relating to the operation of MCT 200 including instructions relating to communications with central station(s) 102. For example, instructions may be stored relating to the detection of certain vehicle operating characteristics, such as the vehicle location, vehicle speed, engine RPM, load status, driver status, etc. Other information stored within memory 204 generally includes instructions for processor 202 to communicate with central station (s) 102. Further, instructions may be stored for managing and controlling vehicle 100. For instance, instructions may be stored within memory 204 for impairing operation of vehicle 100 in an emergency. Each vehicle may have a distinct set of instructions stored within memory 204 for controlling vehicle 100 during pre-defined events.

Vehicle operator interface 206 allows a vehicle operator of MCT 200 to enter instructions into MCT 200, typically comprising a keyboard or keypad and a visual display device. Of course, vehicle operator interface 206 could alternatively comprise other types of interfaces, such as a microphone for entering audible commands, a pointing device such as a mouse, light pen, trackball, and/or a speaker for generating audible information to a vehicle operator. Other types of well-known devices could be used, either alternatively or in combination, with the devices just mentioned. For example, vehicle operator interface may, alternatively or in addition, comprise a biometric device or a card reader.

Vehicle interface 208 allows processor 202 to communicate with one or more electronic control units (ECUs) located onboard vehicle 100, either directly, or through one or more intermediary devices, such as an onboard computer (not shown). Vehicle interface 208 comprises a communication port such as a serial data port for communicating, for example, with an onboard computer. Alternatively, vehicle interface 208 comprises a port for interfacing to a vehicle data bus, such as a J1708 data bus commonly used in vehicles today. Examples of ECUs include a fuel regulator/cutoff switch, an ignition controller, an electronic transmission controller, a steering wheel locking mechanism, and a brake activation unit. Other examples of ECUs include electronic devices which provide operational information about vehicle 100 to processor 202. For example, these types of ECUs comprise a speed sensor, an RPM sensor, an odometer, or a location sensor such as a GPS receiver.

In modern vehicles, the ECUs may be interconnected by a data bus, such as a data bus as specified in SAE J1708, a commonly known communication standard. The data bus is connected to vehicle interface 208 so that communications may take place between processor 202 and the various ECUs connected to the data bus.

Transceiver 210 comprises circuitry to modulate information from processor 202 and convert the modulated information into high frequency signals suitable for wireless transmission. Similarly, transceiver 210 also comprises circuitry to convert received high frequency communication signals into signals suitable for demodulation and subsequent processing by processor 202.

A vehicle operator of MCT 200, typically an operator of vehicle 100, enters vehicle operator identification information into MCT 200 using vehicle operator interface 206, either prior to operating vehicle 100 or subsequently after initial use. The vehicle operator identification information typically comprises a passcode, such as a predefined vehicle operator name and password, although other types of information may be used to validate the vehicle operator, such as a social security number or, in general, a vehicle operator-defined numeric or alpha-numeric code used in combination (or not) with a password.

Figure 3:
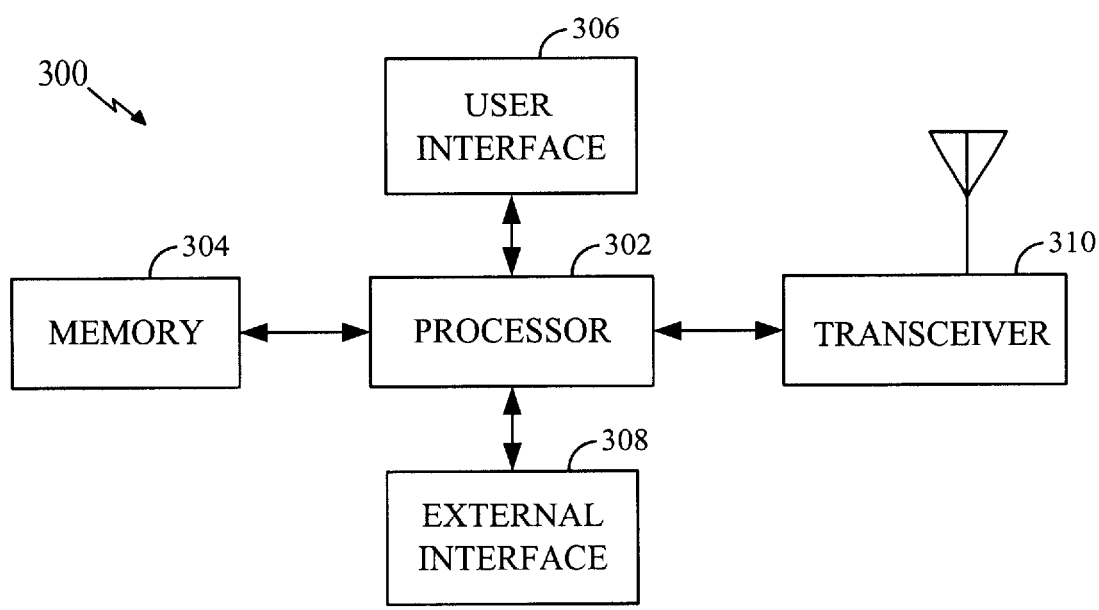
FIG. 3 illustrates a functional block diagram of an apparatus for detecting communication network delays.

FIG. 3 illustrates a functional block diagram of an apparatus 300 for detecting communication network delays located at central station 102 comprising a processor 302, a memory 304, a user interface 306, a transceiver 310, and an external interface 308. It should be noted that the apparatus described in FIG. 3 could be located at central station 102, dispatch center 106, or third party center 108.

Processor 302 generally comprises circuitry necessary for executing executable computer instructions stored in memory 304. For example, processor 302 may comprise a microprocessor and supporting circuitry, such as the Intel 80x86 or Pentium series of microprocessors. Of course, other electronic processors could be used in the alternative. Memory 304 may comprise one or more volatile and/or non-volatile memories, such as a read-only memory (ROM), random-access memory (RAM), electrically erasable programmable read-only memory (EEPROM), a hard drive, a floppy disk drive and floppy disk, or a flash memory. Memory 304 is used to store information relating to the operation of central station 102 and, more specifically, information relating to communications to vehicle 100. For example, one or more databases could be stored within memory 304, each database relating to a fleet of vehicles and containing information pertinent to each vehicle such as license plate number, vehicle identification number, vehicle type, vehicle maintenance schedules, vehicle location, vehicle operational parameters such as speed, RPM, fuel information, oil pressure, load status, etc. Other information stored within memory 304 generally includes executable computer instructions for processor 302 to communicate with vehicle 100 and one or more central stations 102. Further, instructions may be stored for managing and controlling vehicle 100. For instance, instructions may be stored within memory 304 for impairing operation of vehicle 100 in an emergency. Each vehicle may have a distinct set of instructions stored within memory 304 for controlling vehicle 100 during pre-defined events.

User interface 306 allows a user at central station 102 (or wherever apparatus 300 is located) to enter instructions into processor 302, typically comprising a keyboard or keypad and a visual display device. Of course, user interface 306 could alternatively comprise other types of interfaces, such as a microphone for entering audible commands, a pointing device such as a mouse, light pen, trackball, and/or a speaker for generating audible information to a vehicle operator. Other types of well-known devices could be used, either alternatively or in combination, with the devices just mentioned.

External interface 308 allows processor 302 to communicate with one or more remotely located entities, such dispatch centers and third party centers (or central station 102 if apparatus 300 is not located at central station 102). External interface 308 comprises one or more devices for allowing various forms of two-way communications to occur between the various central stations. Examples of external interface comprise a telephonic interface, an optical interface, a data interface (for example, a T1, T3, or the like), an internet interconnection device such as a router, a wireless transceiver, or a combination of these devices, as well as others.

Transceiver 310 comprises circuitry to modulate information from processor 302 and convert the modulated information into high frequency signals suitable for wireless transmission. Similarly, transceiver 310 also comprises circuitry to convert received high frequency communication signals into signals suitable for demodulation and subsequent processing by processor 302.

Figure 4:
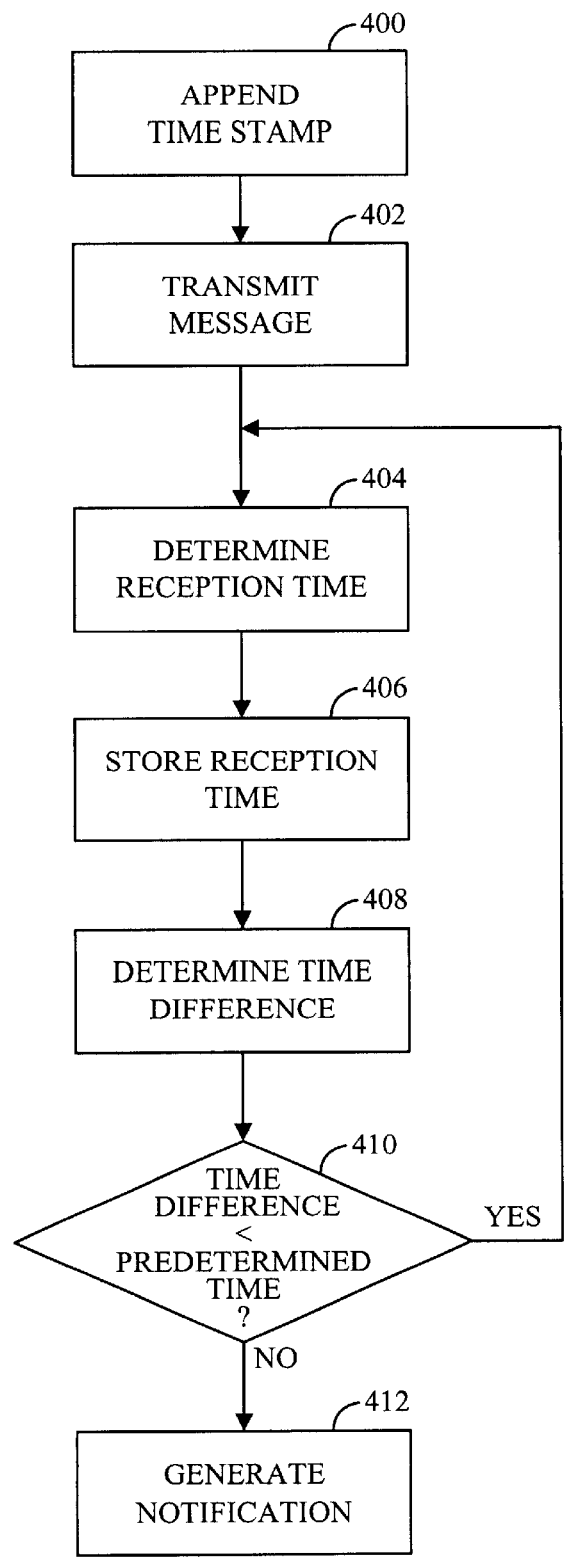
FIG. 4 is a flow diagram illustrating a method for determining communication network delays.

FIG. 4 is a flow diagram illustrating a method for determining communication network delays. In step 400, a time stamp is appended to a message prior to the message being transmitted by MCT 200. The time stamp indicates an approximate time that the message is transmitted. In step 402, the message is transmitted from the MCT 200 through the terrestrial communication system 104 and received by central station 102. In step 404, processor 302 determines the time that the message was received, and in step 406, stores that information in memory 304. Generally, steps 404 and 406 are repeated for each message that is received by central station 102.

In step 408, processor 302 determines a time difference between the time stamp and the time when the message was received. In step 410, processor 302 compares the time difference to a predetermined time. The predetermined time is chosen to represent a problem with message delivery over the terrestrial communication system 104. A typical value for the predetermined time is five seconds. The time difference is then typically stored in a memory, as shown in step 412.

If the time difference is less than the predetermined time, processing reverts back to step 404. On the other hand, if the time difference is greater than the predetermined time in one embodiment, processor 302 generates a notification indicating that the message was delayed by more than the predetermined time period, as shown in step 412. The notification may be sent to one or more entities, for example, to an operator of central station 102, to dispatch center 106 or third party center 108, such as a service provider associated with wireless network 104. In an alternative embodiment, the notification is sent only if the number of messages received having a time difference greater than the predetermined time exceeds a predetermined number, generally within a predetermined time period. For example, a notification would be sent if more than 100 messages are received having a time difference of greater than 60 seconds in any 3 minute time period. In any case, the notification may be sent using one or more of a variety of ways, either automatically or by operator action, over the Internet (ie, email or other data notification), telephone, pager notification, and so on.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

We claim:

1. An apparatus for detecting communication network delays, comprising:

a receiver for receiving a message from a vehicle, said message comprising a time stamp indicating when the message was transmitted;

a processor for determining a time that the message was received, for determining a time difference between the time stamp and the time when the message was received, for comparing the time difference to a predetermined time, for determining a number of messages received having a time difference greater than said predetermined time, and for generating a notification if said number of messages received having a time difference greater than said predetermined time exceeds a predetermined number; and an interface for providing said notification to an entity.

2. A signal-bearing medium tangibly embodying a program of machine-readable instructions executable by a digital processing apparatus to perform a method for detecting communication network delays, said method comprising operations of:

receiving a message from a vehicle, said message comprising a time stamp indicating when the message was transmitted;

determining a time that the message was received;

determining a time difference between the time stamp and the time when the message was received;

comparing the time difference to a predetermined time;

determining a number of messages received having a time difference greater than said predetermined time; and generating a notification if said number of messages received having a time difference greater than said predetermined time exceeds a predetermined number.

3. A method for detecting communication network delays, comprising:

receiving a message from a vehicle, said message comprising a time stamp indicating when the message was transmitted;

determining a time that the message was received;

determining a time difference between the time stamp and the time when the message was received;

comparing the time difference to a predetermined time;

determining a number of messages received having a time difference greater than said predetermined time; and generating a notification if said number of messages received having a time difference greater than said predetermined time exceeds a predetermined number.

* * * * *